United States Patent

Loppoli

[11] Patent Number: 5,443,588
[45] Date of Patent: Aug. 22, 1995

[54] CUTTER-MIXER-FEEDER WAGON WITH CENTRALLY IMPROVED SCREW PROFILE

[75] Inventor: Giuseppe Loppoli, Grantorto, Italy
[73] Assignee: Seko Spa, Curtarolo, Italy
[21] Appl. No.: 200,281
[22] Filed: Feb. 23, 1994

[30] Foreign Application Priority Data

Feb. 26, 1993 [IT] Italy .................. VI93A0028

[51] Int. Cl.⁶ ............................................ A01K 5/00
[52] U.S. Cl. .................... 414/526; 241/260.1; 198/662; 366/85
[58] Field of Search ............... 414/507, 526, 501, 502, 414/326; 198/663, 669662, 670, 671; 241/277, 278.1, 292.1, 296, 260.1; 366/186, 156, 133, 321, 83, 84, 85

[56] References Cited

U.S. PATENT DOCUMENTS

| 333,965 | 1/1886 | Moore ............................. 198/662 X |
| 3,593,843 | 7/1971 | Hill ......................................... 198/662 |
| 3,812,985 | 5/1974 | Lindeborg et al. .................. 414/526 |
| 4,344,580 | 8/1982 | Hoshall . |
| 4,694,993 | 9/1987 | Endo et al. ................... 241/260.1 X |
| 4,720,047 | 1/1988 | Knight . |
| 4,950,081 | 8/1990 | List ......................................... 366/85 |
| 4,951,883 | 8/1990 | Loppoli et al. ............... 241/260.1 X |
| 5,148,999 | 9/1992 | Curfman et al. .................. 241/260.1 |
| 5,199,638 | 4/1993 | Fischer ........................... 414/526 X |
| 5,199,638 | 4/1993 | Fischer . |

FOREIGN PATENT DOCUMENTS

| 1297390 | 6/1969 | Germany .................. 414/526 |
| 277103 | 11/1988 | Japan ...................... 414/526 |
| 290561 | 10/1992 | Japan .................... 241/260.1 |
| 941256 | 7/1982 | U.S.S.R. ...................... 198/663 |
| WO93/00799 | 12/1991 | WIPO . |

*Primary Examiner*—Frank E. Werner
*Attorney, Agent, or Firm*—Watson, Cole, Grindle & Watson

[57] ABSTRACT

The invention carries out a cutter-mixer-feeder for fodder and grass or straw materials which includes a container (2) with at least one opening (3) for introducing the material (23) to be processed and at least one door (24) for discharging the processed material; inside the container there is at least one screw feeder (7), placed at the bottom (76) of said container (2) and provided with at least a pair of spirals (9, 10), one of which is rolled up clockwise, while the other counterclockwise. In the substantially central area of the screw feeder where said spirals (9, 10) meet, they set out a discoidal element (16) consisting of a right half spiral (162) and a left half spiral (161), each of which has at least one outlet (260) which is obtained by taking away a part of the half spiral itself.

14 Claims, 4 Drawing Sheets

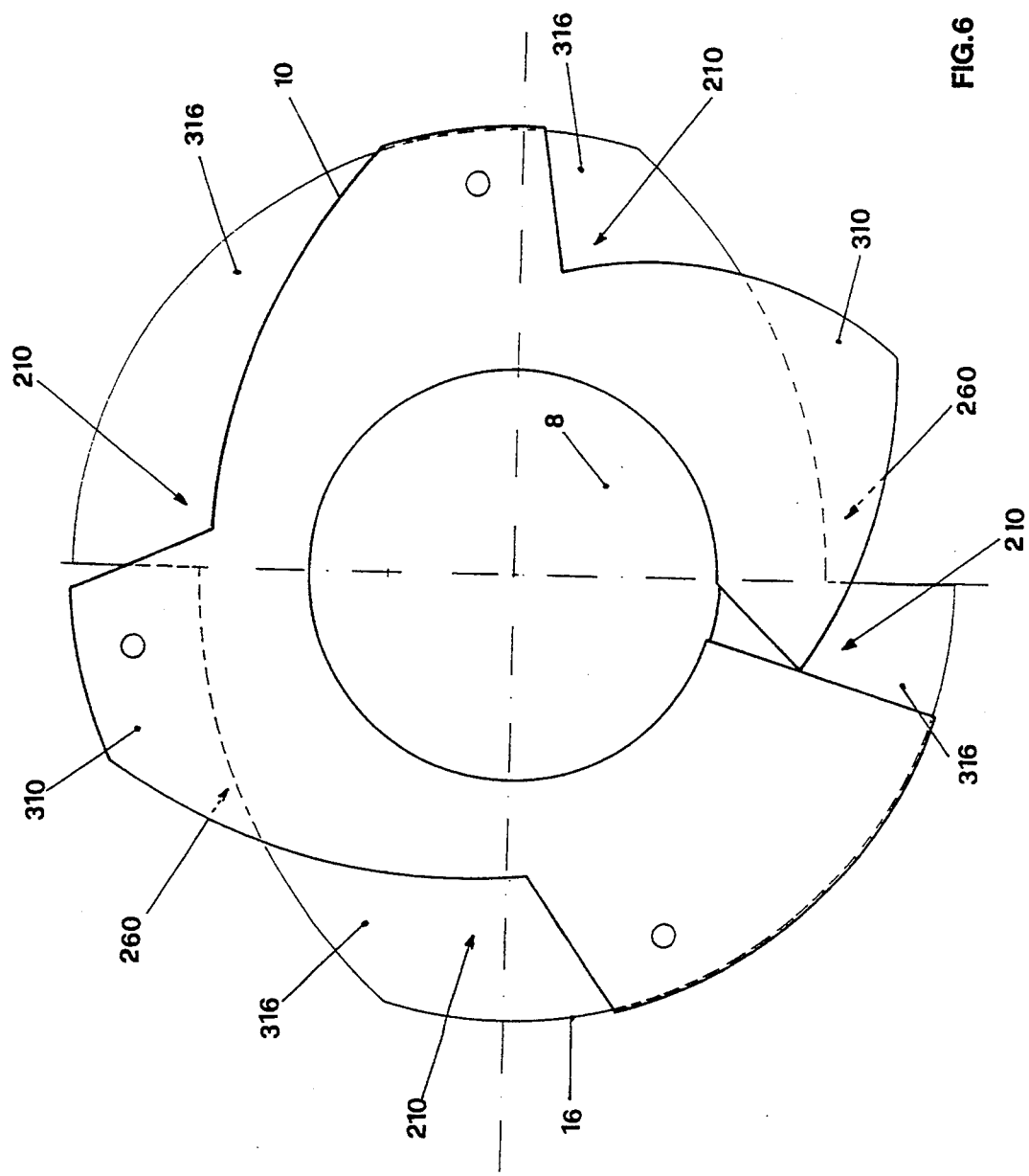

CUTTER-MIXER-FEEDER WAGON WITH CENTRALLY IMPROVED SCREW PROFILE

BACKGROUND OF THE INVENTION

1. Field of the Invention

The invention is a wagon particularly suitable for cutting and mixing long-fibre products, such as fodder and grass or straw materials, made up in bales or in their natural state; it is provided with screw feeders which have been perfected in the profile of their central part.

2. General State of the Art

The wagons of the known kind are generally made up of a container, inside which, there are one or more screw feeders, placed partly in the lower area of the container and partly in its upper area. Such wagons are especially suitable for cutting and mixing short-fibre products and present great difficulties in cutting long-fibre products, such as fodder or straw or grass materials, particularly when great quantities are involved.

As a matter of fact, while cutting or mixing long-fibre products the screw feeders placed in the upper part have a tendency easily clog up to quite, since the material gets entangled around them and prevents or even stops the rotation. Often it can go so far as to even bend the screw feeder.

The same problem, even if to a lesser extent, arises also with the lower screw feeders. Furthermore, said operation of cutting becomes impossible when fodder is made up in bales.

SUMMARY OF THE INVENTION

It is to find a solution for such difficulties that the inventor has carried out the perfected cutter-mixer-feeder wagon which is the object of the italian registration No. VI91A000108; such an invention is provided with two screw feeders with opposing spirals placed at the bottom of the wagon and, in the area where said spirals converge, each shows a diaphragm which is orthogonal to the longitudinal axis of the screw feeder and consists of two truncated cone-shaped surfaces united in correspondence with their greater base and converging towards the ends of each screw feeder.

The screw feeders carried out following such a criterion considerably improve the operations of cutting and mixing the product, but still they are not the best solution to avoid clogs.

Moreover, they do not ensure that the product is cut regularly enough with a steady absorption of power.

It is to further improve the performance level in cutting, mixing and distributing the product that the wagon equipped with screw feeders with central perfected profile has been invented; its chief aim is to remove any possibility of clogging of the screw feeders while working.

Another aim of the invention is to achieve a more regular cutting of the product.

A further goal is to improve the rotation of the product inside the wagon and consequently to improve also the mixing of the product itself.

Another aim is to accomplish a homogeneous rotation of the screw feeders with a steady absorption of power.

Finally, a further goal is to improve the regularity in discharging the cut product out of the wagon.

The aims described above have been achieved by carrying out a cutter-mixer-feeder for fodder and grass or straw materials, which comprises, according to the main claim:

a container provided with at least one opening to let in the material to be processed and with at least one door to discharge the processed material;

at least one screw feeder placed inside a compartment with curved profile obtained at the bottom of the container; said screw feeder is provided with at least a pair of spirals on which peripheral cutters are fixed, one being rolled up clockwise and the other counterclockwise starting from the ends of the screw feeder and of such a kind that they convey the processed material towards the central part of the screw feeder; it is characteristic that, in the substantially central area of the screw feeder where said spirals meet, they set out a discoidal element consisting of a right half spiral and a left half spiral, each of said half spirals showing at least one outlet obtained by taking away a part of the half spiral, each outlet with the sides of its profile substantially orthogonal to each other. According to a favourite executive form the wagon is provided with two screw feeders and the discoidal element of each of them consists of a pair of half spirals which are set so that the left half spiral faces the end of the right spiral of the screw feeder, while the right half spiral faces the end of the left spiral of the screw feeder itself.

The outlets of the discoidal element are two, one for each of the two half spirals which make it up, and are placed opposite to each other, preferably one at 1800 with respect to the other.

Besides, at the end facing the corresponding half spiral that makes up the discoidal element, each of the spirals forming the screw feeder presents other outlets obtained by taking away a part of spiral and angle-staggered with respect to the outlets made in the discoidal element, so that each empty area corresponding to an outlet in the discoidal element substantially faces a full area belonging to the spiral and vice versa.

BRIEF DESCRIPTION OF THE DRAWINGS

The aim described above is highlighted describing a favourite form for the implementation of the invention with reference to the attached tables:

FIG. 6 shows another cross section of the screw feeder in correspondence with the final part of a spiral of the screw feeder superimposed on the discoidal element adjoining it.

DESCRIPTION OF THE PREFERRED EMBODIMENTS

Figure 1:
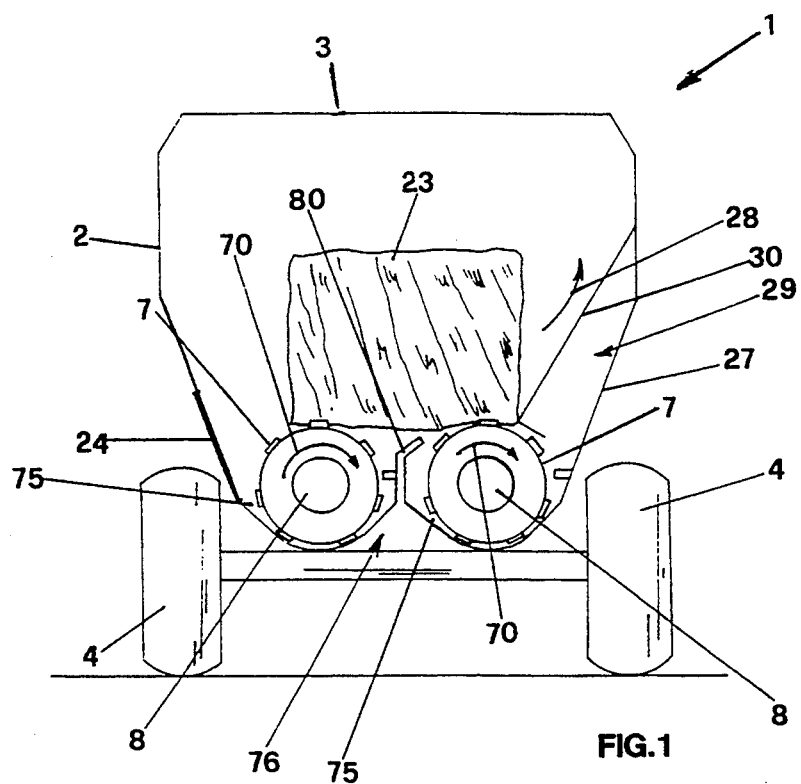
FIG. 1 shows a cross section of the wagon that is the object of the present invention.

As FIG. 1 shows, the wagon object of the present invention, referred to with 1 as a whole, consists of a container 2 on four wheels 4, which in its upper part has an opening 3 for loading the material to be processed.

Figure 2:
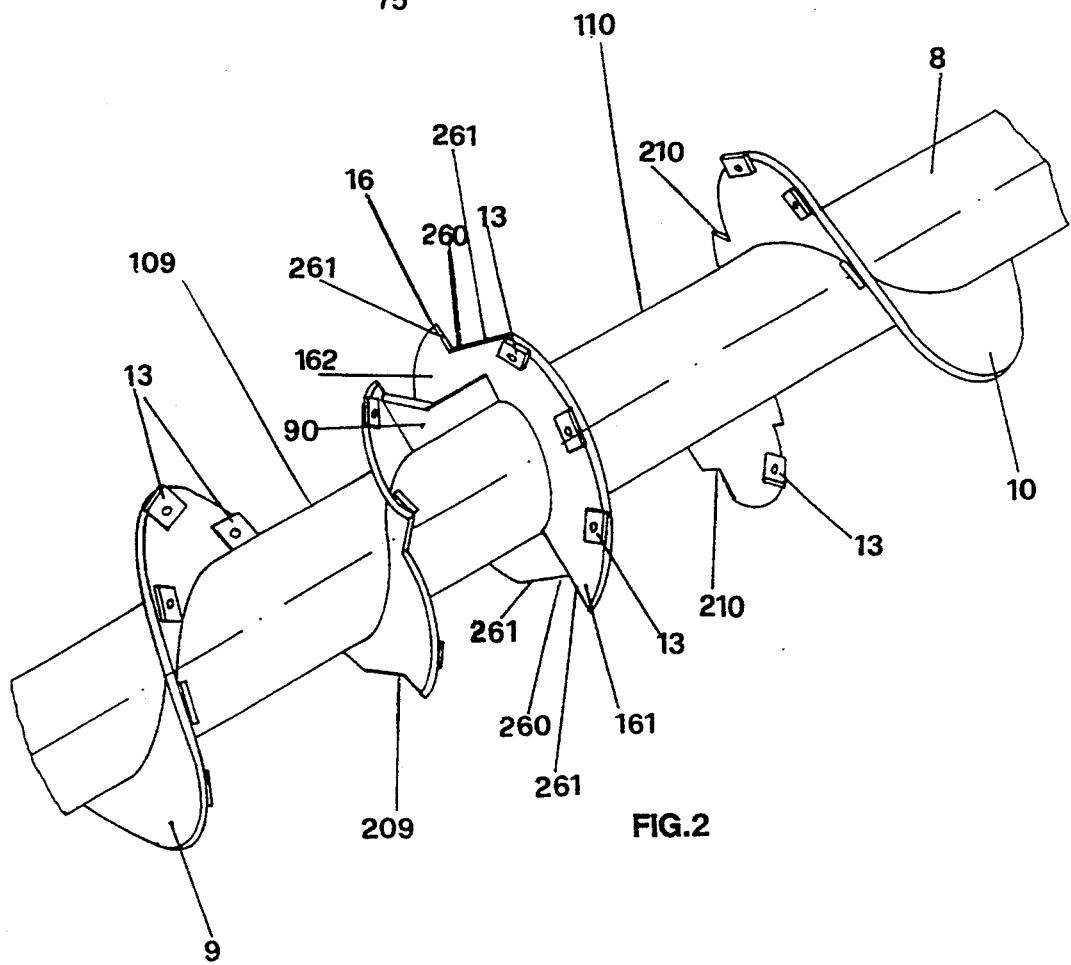
FIG. 2 shows an axonometric view of the screw feeders of the wagon.

The container 2 is preferably made of plate and a pair of screw feeders 7 is placed at its bottom, each one of which, as FIG. 2 shows, is made up of a central part 8 on which two opposing spirals 9 and 10 are rolled up and is housed inside a compartment with curved profile 75 obtained at the bottom 76 of the container 2.

In particular, the spiral 9 is rolled up counterclockwise, while the spiral 10 is rolled up clockwise so that starting from the two ends of the central part 8 they show an advancement converging in the central part of the screw feeder they belong to.

On its periphery each of said spirals also presents a multiplicity of cutters 13 projecting with respect to the outer edge of the spirals themselves.

Figure 3:
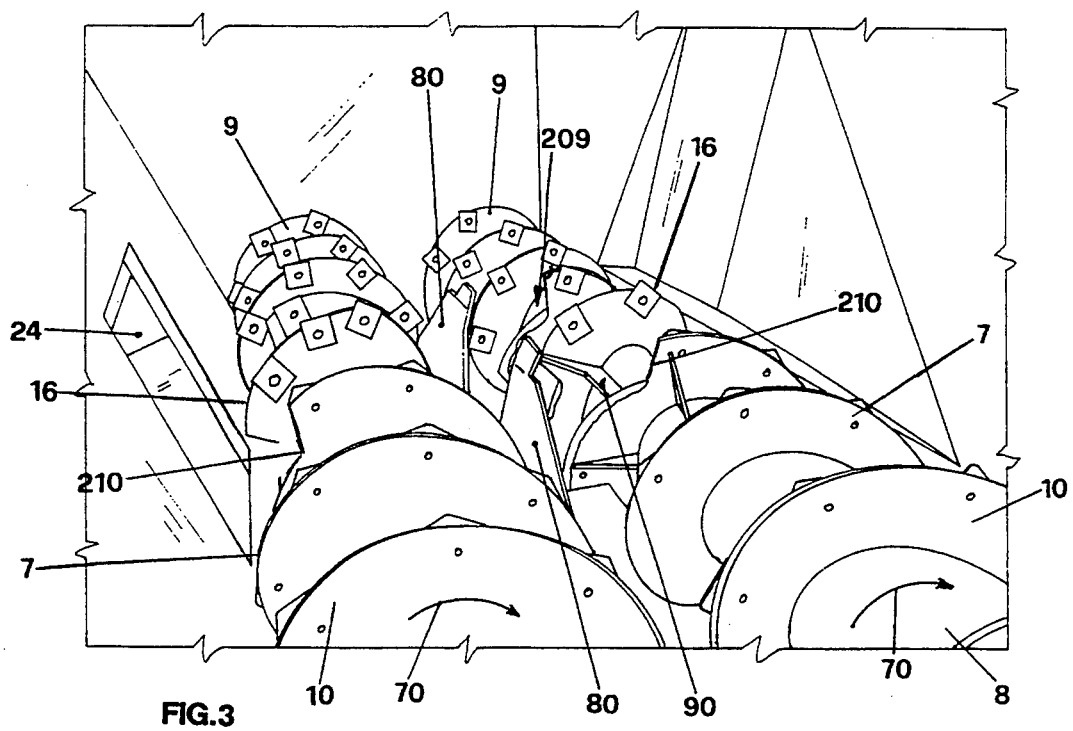
FIG. 3 shows an axonometric view of the screw feeders of the wagon.
Figure 4:
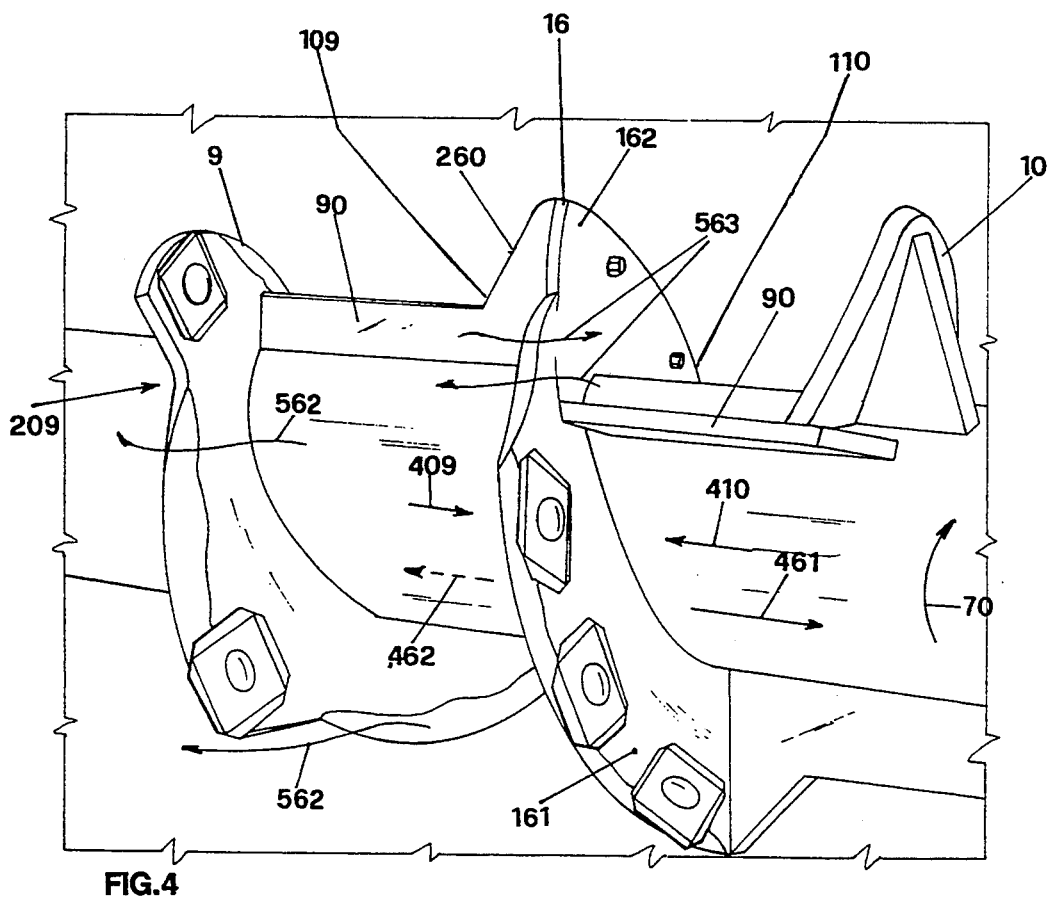
FIG. 4 shows the detail of the central part of one of the screw feeders in which the discoidal element is obtained.

As FIGS. 2, 3 and 4 show, in correspondence with its central area each screw feeder 7 has a discoidal element 16 consisting of a left half spiral 161 and a right half spiral 162; each of these has an outlet 260 which is obtained by taking away a part of each half spiral and shows the sides 261 of its profile being substantially orthogonal to each other.

Besides, each of said half spirals making up the discoidal element is arranged so that the left half spiral 161 is opposite to the final part 110 of the right spiral 10 of the screw feeder, while the right half spiral 162 is opposite to the final part 109 of the left spiral 9 of the screw feeder.

In correspondence with the end 110 of the right screw feeder 10, there are other outlets 210 and likewise in correspondence with the end 109 of the left screw feeder 9 there are other outlets 209; said outlets at the ends of the screw feeders are obtained like the outlets of the discoidal element, that is, by taking away a part of the spiral, and likewise said outlets have substantially orthogonal sides forming their profile.

Figure 5:
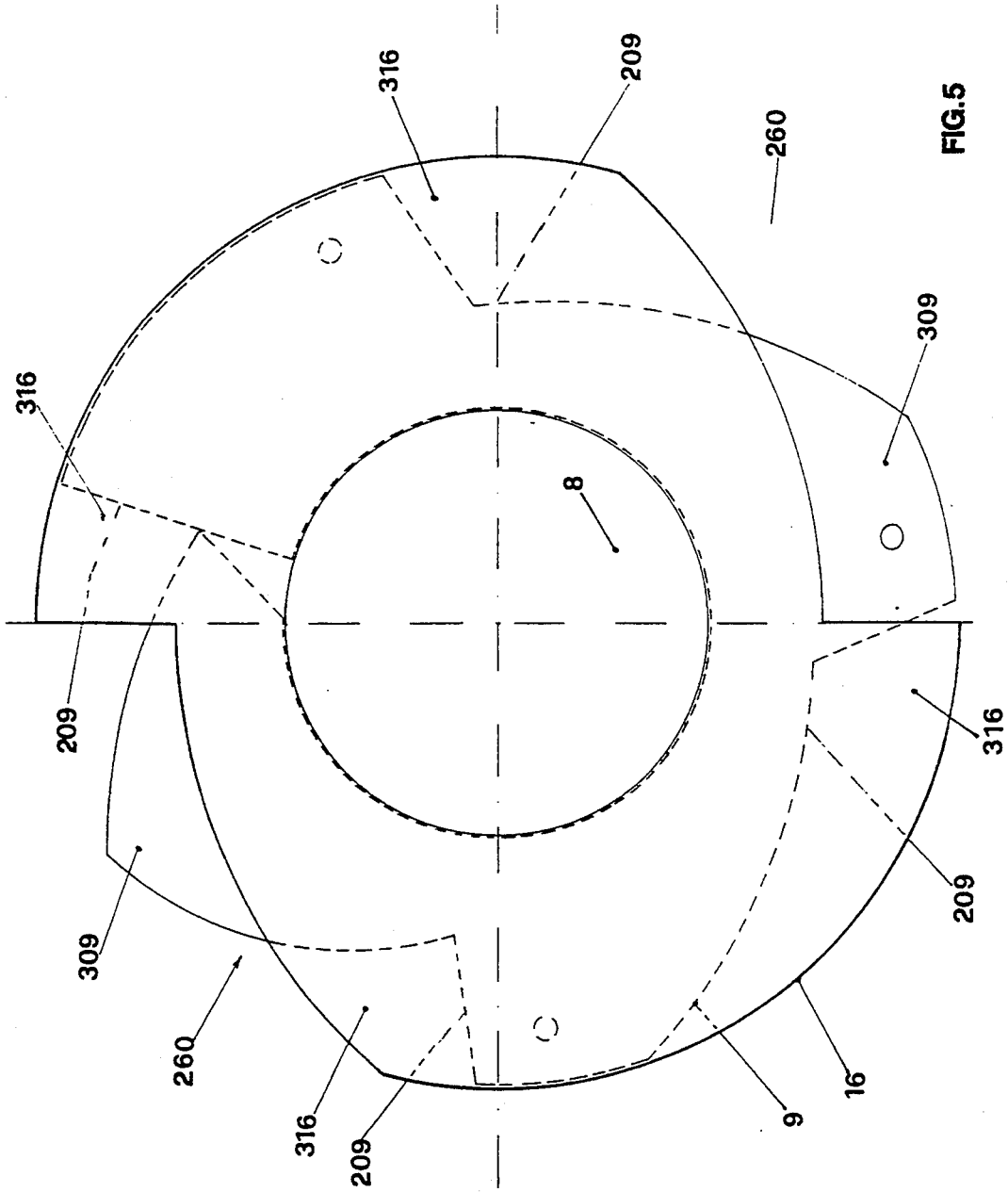
FIG. 5 shows the cross section of one screw feeder obtained in correspondence with the discoidal element superimposed on the end of the spiral of the screw feeder adjoining it.

In particular, it can be noticed that the outlets at the ends of the spirals and in the discoidal element are staggered, as FIGS. 5 and 6 show.

In particular, said figures show that each outlet 260 made in the discoidal element 16 is opposite in axial direction to a part 310 of the right spiral 10 and to a part 309 of the left spiral 9 and likewise each outlet 209 and 210 respectively of the left 9 and right 10 spiral is opposite in axial direction to a part 316 of the discoidal element 16.

It is such a constructive form that allows to reduce to the least the possibility of clogging the screw feeders and at the same time it favours the mixing of the product during the cutting.

As a matter of fact, when the material to be processed, in this case a bale 23 that can be seen in FIG. 1, is placed on the screw feeders 7, when they turn round clockwise 70, the right 10 and left 9 spirals perform an alternating motion that favours the crumbling of the bale.

Moreover, as FIG. 4 shows, they push the material towards the centre of the screw feeder following respectively directions 410 and 409; the material is cut by the cutters 13 and when it comes up to the discoidal element 16, it receives a counterthrust in the directions 461 and 462 respectively by the left half spiral 161 and the right half spiral 162 so as to still create an alternating motion on the material.

Afterwards the material goes through the outlets 209 and 210 (the latter cannot be seen in FIG. 4) and it is favoured in doing so by the thrust of the parts 316 of the discoidal element 16 visible in FIGS. 5 and 6 which face said outlets, following the flow indicated by the arrows 562.

On the opposite side of the screw feeder, which cannot be seen in FIG. 4, a flow takes place exactly in the direction opposite to that indicated by the arrows 562.

Consequently, the outlets of the screw feeders really serve to discharge the product and, by doing away with clogs, they favour a lesser absorption of power during the rotation of the screw feeders, so as to eliminate any absorption peaks which on the contrary occur in the known kinds wagons.

Likewise, during the rotation of the screw feeders the material passes also through the outlets 260 made in the discoidal element 16, pushed as it is respectively by the parts 310 and 309 of the screw feeder, which are opposite to said outlets, following the flow showed by arrow 563. Therefore it is the presence of such outlets 260, 210 and 209, one angle-staggered with respect to the other, that avoids the clogging of the screw feeders and favours the mixing of the material being processed. Between the screw feeders, near the final parts 110 and 109 and near the spirals of the screw feeders there is a pair of directional blades 80 axially spaced out, which can be seen in FIG. 1 and in FIG. 3 and are inclined in the rotation sense 70 of the screw feeders 7; their function is to orientate the flow of the material being processed in the rotation sense of the screw feeders in such a way as to avoid any clogs.

During the cutting the product is directed upwards, precisely towards the right upper part of the screw feeder in correspondence with a deflector 29 applied to the side wall 27 of the container, where the rotation of the product is generally scarce.

The upper surface 30 of said deflector 29, which is opposite to the discharge door 24 as FIG. 1 shows, is inclined in a diverging way towards the outside of the container.

Considering the clockwise rotation 70 of the screw feeders 7, the presence of such a deflector with its surface 30 favours the turning of the material according to the direction 28.

Further, FIGS. 2, 3 and 4 show that between each half spiral 161 and 162 of the discoidal element 16 and the final part of each spiral 10 and 9, one opposite to the other, there are drag blades 90 arranged in a direction which is substantially longitudinal and parallel to the axis of the screw feeder.

As well as favouring the moving of the product upwards so as to help its mixing, these drag blades also improve the discharging of the cut product through the discharge door 24, which takes place with a more regular flow.

Therefore, according to what has been said, one realises that the invention achieves the set goal.

As a matter of fact it has been noticed that the presence of the outlets on the discoidal element and on the ends of the spirals, along with the presence of the directional blades 80 and of the deflector 29, avoids any clogs of the screw feeders during the process and considerably improves the thrust of the product towards the upper part of the screw feeder, thus improving also the rotation of the product on the right side of the screw feeder close to the wall 27 of the wagon, an area where, on the contrary, the product would stay still.

Obviously this improves the mixing of the product, too. It also ensures the advantage of reducing the power necessary for cutting the material, since the screw feeders work in conditions of lesser resistance moment.

It has even been noticed, while making tests, that at the same conditions compared to known wagons with the same capacity it is possible to reduce the power of the installed engines.

Upon implementation, change may be made to the invention and to the screw feeders with which it is provided; such change, however, are to be considered as completely protected by the present invention.

I claim:

1. An apparatus for cutting, mixing and feeding fiber material comprising:

a container having side and end walls and a curved bottom wall forming a compartment with a curved profile corresponding to the curved bottom wall, said container having an open top for introducing the material and at least one of the side walls having an opening for discharging the material;

at least one screw feeder having a central axis and being located in the compartment, said at least one screw feeder having distal end portions and a central portion and including at least one pair of first and second coaxially aligned spirals, each spiral having a distal end located near a corresponding distal end of the screw feeder and a proximal central end located near the central portion of the screw feeder, each of the first and second spirals having a peripheral edge extending radially from the axis and a plurality of cutters fixed to said peripheral edge, the first spiral being clockwise and the second spiral being counterclockwise beginning from the corresponding distal ends of the screw feeder and extending to the central portion, said first and second spirals for conveying the material towards the central portion thereof;

a discoidal element including a right half spiral and a left half spiral coaxially aligned on the screw feeder and being located respectively at the proximal ends of the first and second spirals and disposed in confronting spaced apart relation, said right half spiral and said left half spiral having a peripheral edge formed with at least one cut out portion forming an outlet therein.

2. The apparatus according to claim 1 wherein each of the cut out portions has a first edge portion extending radially from the axis of the screw feeder and a second edge portion extending circumferentially thereof, said first and second edge portions forming a right angle.

3. The apparatus according to claim 1 wherein the right half spiral is located adjacent the proximal end of the first spiral and the left half spiral is located adjacent the proximal end of the second spiral, each of the proximal ends of said first and second spirals having a cut out portion forming an outlet therein, said cut out portion on each of the first and second spirals being offset circumferentially with respect to the cut out portion on each of the right and left half spirals.

4. The apparatus according to claim 1 wherein the cut out portions on each of the right half spiral and left half spiral are generally diametrically opposed on opposite sides of the central axis.

5. The apparatus according to claim 1 wherein the cut out portion on each of the corresponding right half and left half spiral are arranged 180° with respect to each other.

6. The apparatus according to claim 1 wherein at least two screw feeders are located in the curved bottom wall of the housing in side-by-side parallel arrangement.

7. The apparatus of claim 6 further including a plurality of blades being secured to the curved bottom wall and extending upwardly between the screw feeders.

8. The apparatus according to claim 7 wherein the screw feeders are rotatable in a same direction and said blades are affixed to the bottom wall at an inclination corresponding, to the direction of rotation of said screw feeders.

9. The apparatus according to claim 1 further including at least one drag blade located between the right half spiral and left half spiral and being in parallel axial alignment with the central axis of the screw feeder.

10. The apparatus according to claim 1 further including a deflector secured to the side wall of the container opposite the outlet.

11. The apparatus according to claim 10 wherein the deflector is inclined from a lower end to an upper end thereof in a direction outwardly of the container.

12. The apparatus according to claim 1 wherein the screw feeder comprises a central shaft for supporting the first and second spirals and the discoidal element.

13. The apparatus according to claim 1 wherein the discoidal elements are in unobstructed spaced apart relation.

14. An apparatus for cutting, mixing and feeding fiber materials in the form of a wheel carried wagon comprising;

a container having an open top, side and end walls and a curved bottom wall forming a compartment with a curved profile corresponding to said curved bottom wall, said open top for introducing the material therein and said container having an opening in at least one of said sidewalls for discharging the material;

a pair of screw feeders each having a central axis, said screw feeders being mounted side-by-side in the curved bottom wall of said container, and each screw feeder having a distal end portion located at the corresponding end wall of the container and a central portion located centrally of the container, each screw feeder including first and second spiral portions, each spiral portion including a spiral blade extending radially from the central axis, the first spiral being twisted in a clockwise direction and the second spiral being twisted in a counterclockwise direction beginning from the corresponding distal end of the screw feeder and extending towards the central portion, said pair of screw feeders being rotatable in a same sense, and said first and second spirals for rotating the material towards the central portion thereof when the screw feeders are thus rotated;

a discoidal element located in the central portion, between the proximal ends of the first and second spirals, each said discoidal element comprising a right half and a left half spiral disposed in unobstructed confronting spaced relation and being formed with a blade extending radially of the central axis of the corresponding screw feeder, each blade of the corresponding left half spiral and right half spiral being formed with a cut out portion therein, and each of said proximal ends of the spirals having a cut out portion formed in the spiral blade, being offset from the cut out portions of the discoidal element, said first and second spirals and said discoidal element including cutter portions mounted thereon and extending radially from the corresponding spiral blade thereof.

* * * * *